Patented Dec. 5, 1922.

1,437,820

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING CELLULOSE ETHERS.

No Drawing. Application filed April 5, 1921. Serial No. 458,744.

*To all whom it may concern:*

Be it known that I, PAUL C. SEEL, a citizen of the United States of America, residing at Rochester, in the county of Monroe and State of New York, have invented certain new and useful Improvements in Processes of Making Cellulose Ethers, of which the following is a full, clear, and exact specification.

This invention relates to the manufacture of cellulose ethers. One object of the invention is to provide a process which will produce ethers that yield transparent films substantially free from color. Other objects will hereinafter appear.

It has been proposed to make cellulose ethers by reacting on an intimate mixture of cellulose and alkali with an etherifying agent, water being present in some cases in small amounts. The reaction may be carried out in an autoclave in which the ingredients are agitated and heated until the etherification has reached the desired stage. Difficulty has been experienced with a color which appears when ethers are prepared in certain types of autoclaves. Films made from such ethers are not sufficiently free from color.

I have found that the reaction may be carried on successfully in an autoclave lined with steel, films made from the resulting ethers having sufficient transparency and freedom from color. The fresh surface of the steel does, however, cause contamination of the product, yielding dark ethers. But if surface of the steel lining be repeatedly subjected to the action of the ingredients, it becomes immunized, a dark ferrous compound being formed on its surface. When this result is attained, the autoclave yields films free from color. My investigations indicate that the color eliminated by the use of a properly immunized surface is due to some cause which is not clear but for which my immunized steel surface acts as a specific cure.

I may, for example, react upon a very intimate mixture of 100 parts of cotton, 250 parts of water and 200 parts of caustic soda with 400 parts of ethyl chloride under agitation, and at a temperature ranging from 90 to 170° C., over a period of twenty-four hours, for instance. When carried on in an autoclave lined with steel (cold rolled steel being used in the preferred embodiment of my invention) that has been immunized by previous heatings with the same materials, substantially colorless ethyl cellulose is produced which yields satisfactorily transparent films.

Having thus described my invention, what I claim as new and desire to secure by Letters Patent is:

1. The process of making cellulose ethers, which comprises the step of reacting on a mixture containing cellulose and alkali with an etherifying agent in the presence of a large surface of immunized steel.

2. The process of making alkyl ethers of cellulose, which comprises the step of reacting on a mixture containing cellulose and an alkali metal hydroxid with an alkylating agent when confined in a relatively large surface of immunized steel.

3. The process of making ethyl ethers of cellulose, which comprises the step of heating and agitating cellulose, caustic soda, water and ethyl chloride when confined in and contacting with walls of immunized cold rolled steel.

Signed at Rochester, New York, this 26th day of March 1921.

PAUL C. SEEL.